(No Model.)
H. J. BEHRENS.
EARTH CLOSET.
No. 393,608. Patented Nov. 27, 1888.
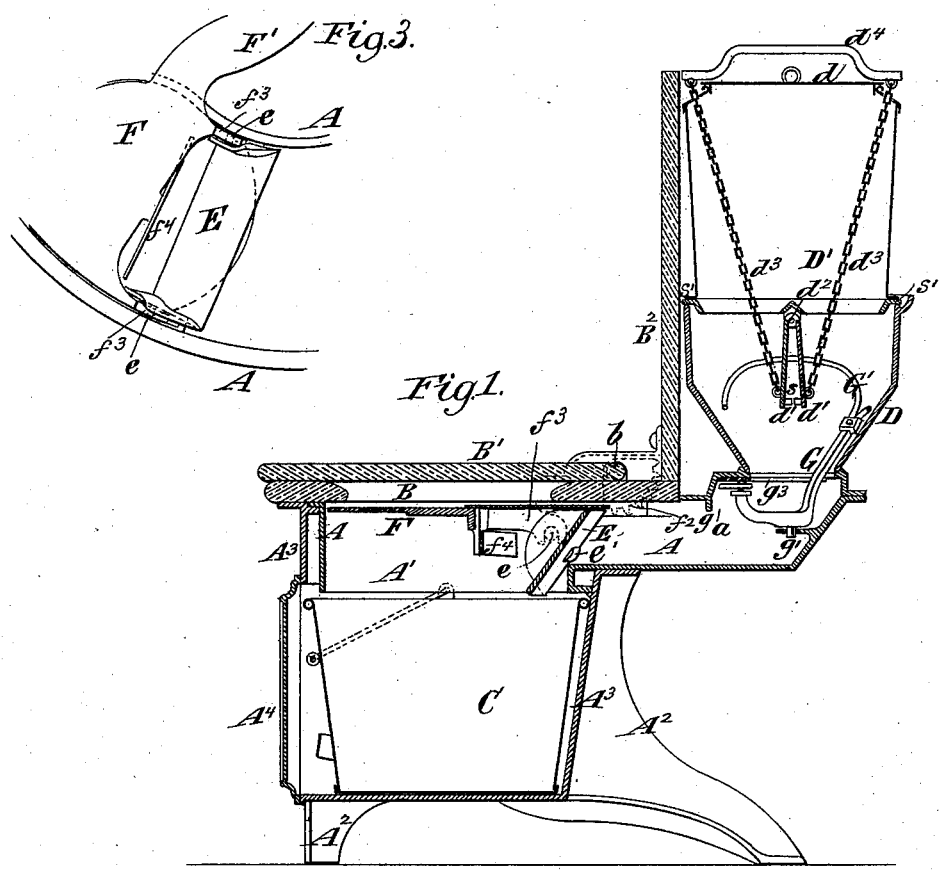
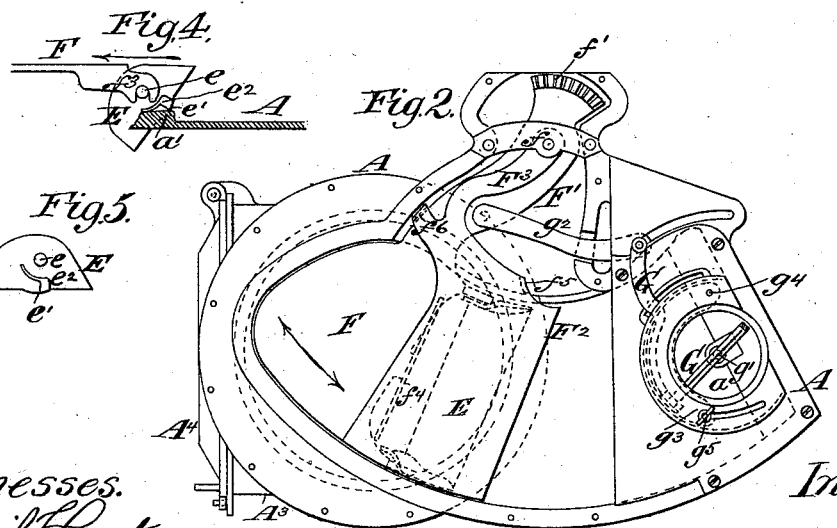
Witnesses.
Emil F. Certer.
C. L. Sundgren.
Inventor:
Henry J. Behrens
By his attys
Brown & Hall.

UNITED STATES PATENT OFFICE.

HENRY J. BEHRENS, OF NEW YORK, N. Y.

EARTH-CLOSET.

SPECIFICATION forming part of Letters Patent No. 393,608, dated November 27, 1888.

Application filed August 17, 1887. Serial No. 247,144. (No model.)

*To all whom it may concern:*

Be it known that I, HENRY J. BEHRENS, of New York city, (Tremont,) in the county and State of New York, have invented a new and useful Improvement in Earth-Closets, of which the following is a specification.

The efficacy of ordinary dry earth or ashes as a means of rendering innoxious human excrement, when thrown or sprinkled thereon, has long been recognized and has led to a limited adoption of earth-closets. Such closets as heretofore made have, however, been of a somewhat rude character and very unsatisfactory as to their manipulation, and they have not approached to anything like the degree of perfection that water-closets have.

The object of my invention is to provide an earth closet which in its way is as complete an apparatus as a water-closet, and to provide for the depositing upon the excrement after each use of the closet a definite and sufficient quantity of earth, without any liability of the escape of dust or spilling the earth, the whole apparatus being comprised within a casing in which no wood is used where it is exposed to the odor of the excrement before the earth is dumped thereon.

Briefly described, my apparatus consists of a hollow base or pan, having above it a seat-hole, and below the seat-hole an opening in the bottom, beneath which a metal pail or receptacle may be placed, and having at the opposite end a feeding-opening in the top, which is surmounted by a hopper. Upon this hopper may be placed an earth can or pail having a hinged bottom connected by chains with a handle, which has no direct connection with the can or pail, and consequently when the can or pail is lifted by the handle the bottom is first closed, and when the handle is released the bottom swings open downward. This can or pail, having been filled with earth, by carrying it to the place where the earth is obtained, is returned to its position on the hopper, and the bottom swings open, allowing the earth to descend to fill the hopper and through the feeding-opening to fall into the pan or base. Within the hollow base or pan is a sliding tilting shovel, which works over the bottom of the pan, so as to scoop up some of the earth, and then, when it reaches the hole in the bottom, beneath which is the receptacle, to tilt and dump the earth into the receptacle upon the excrement. The hollow base or pan is or may be of segmental form in its plan, and the shovel is worked by a top plate supported by a horizontally-extending and pivoted arm, which covers the base or pan beneath the seat-hole and prevents dust from arising when the shovel is operated. This top plate has combined with it and operates a secondary top section, which completes the covering of the base or pan when the shovel is operated, and is operated from the main top plate, and there is lost motion between these two portions of the top in their operation, so that the shovel will be exposed to enter the earth when it is moved in one direction, as will be hereinafter more fully understood. The top plate comprises a fixed downwardly-extending plate or flange, which forms a back to the shovel as it is thrust into the earth, and there is upon the base or pan a stationary scraper, beneath which the shovel works, and which limits the amount of earth taken by the shovel. There is in the hopper a shaker or loosener of the earth, which is actuated when the top plate is swung and the shovel is operated, and which prevents clogging of the earth in the hopper and feeding-opening of the base or pan. The top plate and shovel are operated by an outside handle, and the seat-cover may be geared with them, so as to form such a handle.

The invention consists in novel combinations of parts, which are above briefly referred to and hereinafter particularly described, and pointed out in the claims.

In the accompanying drawings, Figure 1 is a vertical section of my complete closet, the shovel being represented in its dumping or tilted position. Fig. 2 is a plan of the main portion of the closet apparatus, the hopper and the seat being removed. Fig. 3 is a plan of a portion of the base or pan, showing also the shovel and a portion of the top plate and arm for operating it, the parts being represented in the same position as in Fig. 1. Fig. 4 is a section of a portion of the pan and end view of the shovel in the same position as in Fig. 1 and a portion of the top plate which engages therewith, and Fig. 5 is an end view of the shovel alone in horizontal or sliding position.

Similar letters of reference designate corresponding parts in all the figures.

A designates the hollow base or pan, which may be of cast metal, and which is surmounted by a seat, B, here represented as closed by a cover, B', pivoted or hinged at b. This base or pan is mainly open at the top, and is closed by the seat B, which may also have a back, B², extending upward from its inner edge. The base or pan extends for a distance rearward of this back, and such extended portion is closed at the top, save for a feeding-opening, a, and the bottom of the base or pan is substantially flat, and is provided with a large opening or short downwardly-presented throat, A', beneath which may be placed a pail or receptacle, C, usually of metal.
The base or pan may be supported by legs A², and has secured upon it, beneath the throat or opening A' in its bottom, a casing, A³, which receives the pail or receptacle C, and which is only sufficient in size to receive such pail or receptacle. This casing A³ has a rounded or semicircular back, and has a square form at the front, as best shown in Fig. 2, being closed by a door, A⁴, sufficient in size to permit the lateral withdrawal and insertion of the pail or receptacle C, so that it may be emptied whenever desired. These parts, save the seat and back B B², are constructed of metal, so that they will not retain odor if any arises from the pail or receptacle.
I will now refer to the means for supplying the earth. I have shown the feeding-opening as surmounted by a hopper, D, which is preferably circular in transverse section, of a form shown in Fig. 1, and this hopper is surmounted by a pail or can, D', of metal. This pail or can D' has a removable cover, d, and it has a hinged bottom, here shown as made in two sections, d', hinged at about the middle of the diameter of the can at d², and connected by chains d³ with the handle d⁴, which forms a bridge over the cover d. This handle is not directly connected with the can or pail, but is movable relatively thereto. The chains d³, which connect the said handle with the bottom sections, d', pass through openings in the top of the pail or can outside of the cover, so that they and the cover do not interfere with each other. When the pail is lifted by the handle d⁴, the first action will be to close the bottom d', and then to lift the can or pail. This can or pail may be readily lifted from the hopper and carried to a place where the earth is obtained, and during its transit, or while resting on a supporting-surface by the short legs s, provided on the sections d', the bottom will be held closed; but as soon as it is replaced upon the hopper and supported by its flange s', and the handle released, the bottom d' falls open and the earth descends into the hopper D and through the feeding-opening a into the base or pan A as fast as it is removed from below the feeding-opening.

It will be observed by reference to Fig. 1 that the pail D' is supported entirely by the bearing which it has at its periphery upon the hopper D, and the hinged bottom of the pail, in swinging open, does not swing beyond the periphery of the pail, at which it has its bearing on the hopper. Therefore the hopper contains ample space for the hinged bottom of the pail to work in. The last-mentioned operation of the hinged bottom is effected without any disturbance of the cover, and without any dispersion of the dust which is unavoidably raised by the falling of the earth out of the can or pail into the hopper.

The means for transferring the earth from the part of the base or pan which is below the feeding-opening consists of a shovel, E, and a handle which is external to the apparatus, and by its operation works the shovel. As here represented, the handle consists of the seat-cover B', which is connected as hereinafter described, and it operates the shovel through the medium of a top plate, F, which I shall also soon describe. The top plate, F, is shown best in Figs. 2 and 3, but also in Fig. 1. It consists of a plate which, as shown in Fig. 2, is fitted to a portion of the contour of the pan or base A at its open top, and is carried by a horizontally-extending arm, F', which, as here represented, is pivoted at f, and has immediately beyond its pivot a gear-sector, f'. In this example of my invention the said cover B', which constitutes a handle, has concentric with its pivot a companion sector, f², as is shown dotted in Fig. 1, and when the seat is raised and lowered the top plate, F, is swung horizontally in the directions indicated by the double-headed arrow in Fig. 2.
The base or pan is here represented as being of substantially segmental form, concentric with the pivot f, and the shovel E is of a size and shape to substantially fit the width of the pan, as best shown in Fig. 3. Upon each side of the top plate, F, and close to the side walls of the base or pan A, are downwardly-projecting ears or lugs f³, which are forked, as shown in Fig. 4, and which embrace trunnions e upon the ends of the shovel E. Consequently it will be seen that as the top plate, F, is swung to and fro the shovel will be carried beneath the feeding-opening a, where it takes its supply of earth, and will then be brought back to the throat A', where it is tilted or dumped.
Upon the bottom of the shovel E is a lump or projection, e', which, as the shovel is moved in one or the other direction, causes the advancing edge to scrape upon the bottom of the base or pan A, and so to make a clean sweep of any earth which may be upon the bottom. Upon the ends of the shovel are cams e², a preferred form of which is best shown in Fig. 5, and upon the bottom of the pan A, adjacent to the throat A', are lugs or cam-like projections a'. As above stated, the movement of the top plate in one direction causes the shovel to first come to a substantially horizontal position upon the bottom of the base or pan A, and then to advance and strike into the earth which is below the feeding-opening a. As the top plate, F, is then moved in the direction of the arrow, Fig. 4, the shovel is brought back to the throat A', moving horizontally until the cams e² strike the lugs or cam-like projections $a'$ upon the base or pan A, whereupon the shovel is first slightly lifted, and is then, by the formation of the cams $e^2$ and the action of the lugs or projections $a'$, tilted to the position shown in Fig. 1, and the earth is dumped upon the excrement in the pan or receptacle C.

The parts are so proportioned that when the shovel E is dumped or tilted the top plate, F, comes to a bearing against the edge of the base or pan, and closes a part, at least, of the opening in the seat, thereby preventing dust from arising. Upon the top plate, F, is a downwardly-extending flange or plate, $f^4$, which serves as a back to the shovel E when it is swung into horizontal position and while it is being pushed into the earth, and inasmuch as the shovel, when tilted to the position shown in Fig. 1, swings clear of this plate $f^4$, there is no interference with its dumping its load of earth. To complete the closure of the seat-opening when the shovel is operated to dump earth into the pail or receptacle C, I employ a secondary section of top plate, $F^2$, which is supported by an arm, $F^3$, pivoted at $f$ also, and which has downwardly-turned ears or lugs $f^5 f^6$ at opposite sides of the arm $F'$. When the top plate, F, is swung toward the feeding-opening $a$ from the position shown in Fig. 2, the secondary section $F^2$ of the top plate is not moved until the arm $F'$ strikes the ear or lug $f^5$, thereby giving lost motion or play between the two and allowing the shovel E to be advanced beyond the section of top plate, $F^2$. As soon as the arm $F'$ strikes the lug or ear $f^5$ it moves the plate-section $F^2$ until the latter strikes against the base or pan, whereby the section of plate is arrested. The downwardly-projecting flange $g$ serves as a scraper, whereby the load of earth upon the shovel E is limited as the latter slides back loaded to the throat $A'$. When the top plate, F, is moved in a direction to carry the shovel E away from the feeding-opening $a$, the plate-section $F^2$ is not moved until the arm $F'$ strikes the lug or ear $f^6$, and the plate-section $F^2$ therefore drags behind the top plate, F, and completes the closure of the seat-opening when the shovel E is dumped.

I have shown the scraper or earth-stirrer G as substantially fitting the side wall of the hopper, and having a wire extension, $G'$, and as pivoted at $g'$ below the hopper. One arm of this scraper is connected by a link, $g^2$, with the arm $F'$, and consequently when the shovel is operated the scraper G has a slight circular movement, which tends to prevent the earth from clogging in the hopper. I have likewise shown a segmental regulator or valve, $g^3$, which is pivoted at $g^4$ in the feeding-opening, and which has at the opposite end a thumb-piece, $g^5$. This may be swung upon its pivot so as to more or less close the feeding-opening.

Suppose that a prior deposit of earth is in the pail or receptacle C and a person desires to use the closet. He first lifts the seat, which swings the top plate, F, toward the feeding-opening $a$, and carries the shovel over so as to take up its charge of earth. After use of the closet the seat is depressed, and the shovel, with its load of earth, is brought back to the throat $A'$ and dumped, to deposit the earth upon the excrement in the pail or receptacle C.

It will be seen that the closet is as completely automatic in its operation as is an ordinary water-closet, and even more so, because the mere lifting of the seat serves to operate the shovel E.

Dry ashes may be used instead of earth, and by the word "earth" as herein used I intend to include ashes or other powdered or absorbent substance.

It is very desirable to employ the horizontally-swinging arm F $F'$, because the shovel may be directly hung therein, and also because as it swings in the horizontal plane of movement of the shovel the pan A need be but four or five inches deep to accommodate them, and said arm constitutes the only part interposed between the handle and the shovel.

I am aware that a dredger has been made consisting of a cylindric body and hinged bottom sections with which are directly connected the chains for hoisting the dredger, so that the bottom sections will be closed by the very act of hoisting and carrying the dredger. I therefore seek to cover my earth can or pail $D'$ only when in combination with the hopper D, which has a bearing for supporting the can or pail at its periphery, so that while the can or pail is supported at its outer edge on the hopper its hinged bottom sections may swing downward within the hopper to discharge the can or pail thereinto.

What I claim as my invention, and desire to secure by Letters Patent, is—

1. The combination, with a hollow metal base or pan, as A, supported by legs $A^2$, and having beneath it a casing, $A^3$, in which is placed a soil receptacle or pail, C, the pan A having at one side an opening in its bottom immediately above the pail or receptacle C, and having at the other side a feeding-opening in its top surmounted by an earth-hopper, D, of a seat above the opening in the bottom of said base or pan, a sliding and tilting shovel, E, within the base or pan, a horizontally-swinging arm, $F'$, mounted on a vertical pivot, and in which the shovel is hung, and a handle external to the base or pan and connected with said arm for operating the shovel to transfer earth from the pan to the pail or soil-receptacle C, substantially as herein described.

2. The combination, with an earth-closet and a hopper surmounting the feed-opening, of a removable earth can or pail having a removable cover and a bearing around its periphery on the hopper, and having a hinged bottom which opens by swinging downward, and a handle unconnected with the body, but connected with the bottom by a chain which passes outside of the cover, whereby the lifting of the handle will close the bottom and the release of the handle, when the can or pail is supported by its bearing on the hopper, will permit the bottom to open without disturbance of the cover, substantially as herein described.

3. The combination, with the base or pan of segmental form and having an earth-feeding opening at one end and an outlet-opening in the bottom at the other end, of a swinging top plate having a pivoted supporting-arm, a sliding and tilting shovel working on the bottom of the base or pan and operated by the top plate, and a seat-cover geared with the arm of the top plate for operating it and the shovel, substantially as herein described.

4. The combination, with the base or pan A and the top plate, F, having the pivoted supporting-arm F', of the sliding and tilting shovel E, and a plate, $f^4$, secured to the top plate and forming a back to the shovel when pushed in a direction to fill it, and a handle geared with the arm F', for operating the top plate and shovel, substantially as herein described.

5. The combination, with the base or pan and the sliding and tilting shovel E, of a top plate, F, having the pivoted supporting-arm and connected with the shovel for operating it, a handle for operating the top plate and shovel, and a pivoted dust-guard or secondary top section, $F^2$, having projections between and on which the pivoted arm works with lost motion for operating the guard or section, substantially as herein described.

6. The combination, with the base or pan A, having on its sides the cam-like projections $a'$, of the sliding and tilting shovel E, having at the ends the cams $f^3$, on which said cam-like projections act to tilt the shovel as it is moved, and an outside handle for operating the shovel, substantially as herein described.

7. The combination, with the base or pan and the sliding and tilting shovel and the sectional top plate, F F², the part F serving to operate the shovel and the part F², and the two parts having lost motion between them, of the scraper $g$ and an outside handle for operating the shovel, substantially as herein described.

8. The combination, with the base or pan having at one end a feeding-opening surmounted by a hopper, of a top plate, F, and an outside handle connected with it for operating it, a shovel connected with and operated by the said plate, and a scraper or earth-stirrer arranged in the hopper and feeding-opening and connected with the said top plate for operation thereby, substantially as herein described.

HENRY J. BEHRENS.

Witnesses:
FREDK. HAYNES,
EMIL HERTER.